United States Patent [19]
Hoshi et al.

[11] Patent Number: 5,809,209
[45] Date of Patent: Sep. 15, 1998

[54] VIDEO SIGNAL RECORDING APPARATUS WITH VARYING INTERLEAVING OF DIGITAL VIDEO SIGNALS

[75] Inventors: Hidenori Hoshi, Kanagawa-ken; Akio Aoki, Tokyo, both of Japan

[73] Assignee: Canon Kabushiki Kaisha, Tokyo, Japan

[21] Appl. No.: 355,805

[22] Filed: Dec. 14, 1994

Related U.S. Application Data

[63] Continuation of Ser. No. 183,113, Jan. 18, 1994, abandoned, which is a continuation of Ser. No. 24,849, Feb. 26, 1993, abandoned, which is a continuation of Ser. No. 742,509, Aug. 5, 1991, abandoned, which is a continuation of Ser. No. 317,430, Mar. 1, 1989, abandoned.

[30] Foreign Application Priority Data

Mar. 9, 1988 [JP] Japan .................................. 63-55541

[51] Int. Cl.$^6$ ...................................................... G11B 5/00
[52] U.S. Cl. .............................. 386/124; 360/32; 360/48; 386/116
[58] Field of Search ............................... 360/32, 38.1, 48, 360/53, 22, 74.1, 60; 358/340, 335, 310, 33.1, 35.1; 371/39.1, 40.1, 38.1, 2.1; 348/413; 380/10, 22, 28, 37.14

[56] References Cited

U.S. PATENT DOCUMENTS

| | | | |
|---|---|---|---|
| 3,657,699 | 4/1972 | Rocher et al. | 371/2.1 |
| 4,277,807 | 7/1981 | Baldwin | 360/38.1 |
| 4,558,380 | 12/1985 | Porter | 360/74.1 X |
| 4,559,625 | 12/1985 | Berlekamp et al. | 371/2.1 |
| 4,563,710 | 1/1986 | Baldwin | 360/9.1 |
| 4,638,380 | 1/1987 | Wilkinson et al. | 360/22 |
| 4,656,536 | 4/1987 | Furumoto et al. | 360/47 |
| 4,742,544 | 5/1988 | Kupnicki et al. | 380/14 |
| 4,751,590 | 6/1988 | Wilkinson | 360/32 |
| 4,789,894 | 12/1988 | Cooper | 360/10.1 |
| 4,809,097 | 2/1989 | Fujii et al. | 360/22 |
| 4,852,102 | 7/1989 | Yamaguchi | 371/39.1 |
| 5,043,810 | 8/1991 | Vreeswijk et al. | 358/133 |
| 5,629,811 | 5/1997 | Hoshi | 360/22 |

*Primary Examiner*—Aristotelis M. Psitos
*Assistant Examiner*—Patrick Wamsley
*Attorney, Agent, or Firm*—Robin, Blecker & Daley

[57] ABSTRACT

In a video signal recording apparatus in which video signals are digitized and, after the data arrangement has been transformed, are recorded on a recording medium, the video signals corresponding to one picture are recorded divisionally in a plurality of tracks, and a transforming pattern of the data arrangement is made to change by every one picture of video signals.

11 Claims, 7 Drawing Sheets

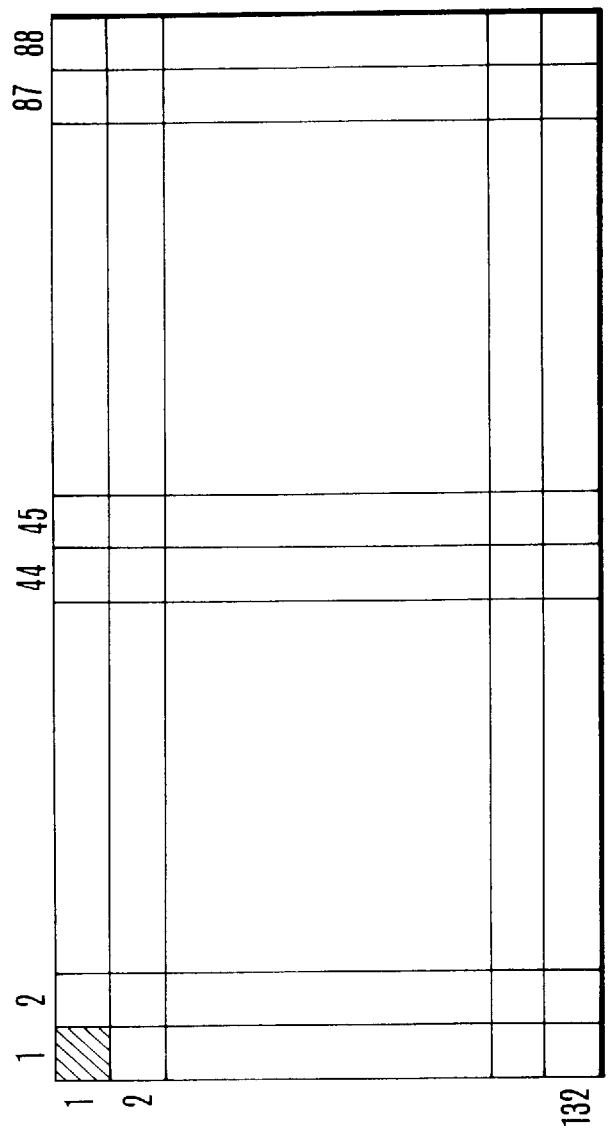

VIDEO SIGNAL RECORDING APPARATUS WITH VARYING INTERLEAVING OF DIGITAL VIDEO SIGNALS

This is a continuation application under 37 CFR 1.62 of prior application Ser. No. 08/183,113 filed Jan. 18, 1994 (aban.), which is a cont. of Ser. No. 08/024,849 filed Feb. 26, 1993 (aban.), which is a cont. of Ser. No. 07/742,509 filed Aug. 5, 1991 (aban.), which is a cont. of Ser. No. 07/317,430 filed Mar. 1, 1989 (aban.)

BACKGROUND OF THE INVENTION

1. Field of the Invention

This invention relates to video signal recording apparatuses and, more particularly, to a video signal recording apparatus for recording video signals in digital form on a recording medium.

2. Description of the Related Art

In the apparatus for recording video signals in digital form, it has been known that the digital recording is preceded by the use of an interleave processing in which the arrangement of data is transformed. By this interleave processing, picture elements which are unable to be reproduced due to a code error which has been produced during recording or reproduction are dispersed over the area of a picture. This provides a possibility of applying an effective correction such as interpolation to the picture elements which are unable to be reproduced. Thus, a great increase in the reproducibility of signals has been achieved in the apparatus of the kind described above.

Even such a digital VTR in which the interleave processing is effected before the recording as described above, however, sometimes fails in the situation where a special reproduction is carried out by transporting a magnetic tape at a speed integer times as fast as the speed for the standard reproduction, a portion of the picture which has once not been reproduced would then continue being unable to be reproduced for a long time. Also, in the digital VTR, there is a high possibility of occurrence of damages to a tape in the longitudinal direction thereof. In this case also, one and the same portion of the picture would not be reproduced for a long time. Further, in a multichannel recording and reproducing apparatus, where video signals corresponding to one picture are recorded in a plurality of tracks at once, when one of a plurality of heads accidentally stops performing its function, all the corresponding certain portions of the picture would become impossible to be reproduced.

SUMMARY OF THE INVENTION

An object of the invention is to eliminate the above-described problems.

Another object of the invention is to provide an apparatus for recording video signals in digital form, in which, without causing one and the same portion of the picture to become unable to be reproduced for a long time, the reproduced picture is excellent over the entire area thereof.

Under such an object, according to the invention, as its one embodiment, a video signal recording apparatus is proposed, comprising input means for inputting digital video signals, arrangement transforming means for transforming the arrangement of the input digital video signals by an arrangement transforming pattern, changeover means for changing over the arrangement transforming pattern of the arrangement transforming means by every one picture, and recording means for recording the digital video signals the arrangement of which has been transformed by the arrangement transforming means on a recording medium.

Another object of the invention is to provide a digital video signal recording apparatus in which even when one of a plurality of heads has come into the inability of reproduction, the picture can be reproduced without lacking one and the same portion thereof for a long time, thus obtaining the properly reproduced picture.

Under such an object, according to the invention, as its one embodiment, a video signal recording apparatus is proposed, comprising input means for inputting digital video signals, arrangement transforming means for transforming the arrangement of the input digital video signals by an arrangement transforming rule, and recording means for recording the digital video signals the arrangement of which has been transformed by the arrangement transforming means on a recording medium, the recording means being arranged to record digital video signals corresponding to one picture divisionally in a plurality of tracks and including a plurality of heads, and the arrangement transforming rule of the arrangement transforming means being determined so that each of the plurality of heads does not record signals located at the same position on a picture for every two consecutive pictures.

Objects of the invention other than those described above and its feature will become apparent from the following detailed description of embodiments of the invention with reference to the drawings.

BRIEF DESCRIPTION OF THE DRAWINGS

FIGS. 2A, 2B and 2C are diagrams to explain the interleave processing in the digital VTR of FIG. 1, with FIG. 2A illustrating the way of division of one frame of picture elements, FIG. 2B illustrating the fashion in which the video sub-blocks in division are grouped, and FIG. 2C illustrating a format for the data to be recorded in each track.

DETAILED DESCRIPTION OF THE PREFERRED EMBODIMENT

The invention is next described in connection with an embodiment thereof with reference to the drawings.

Figure 1:
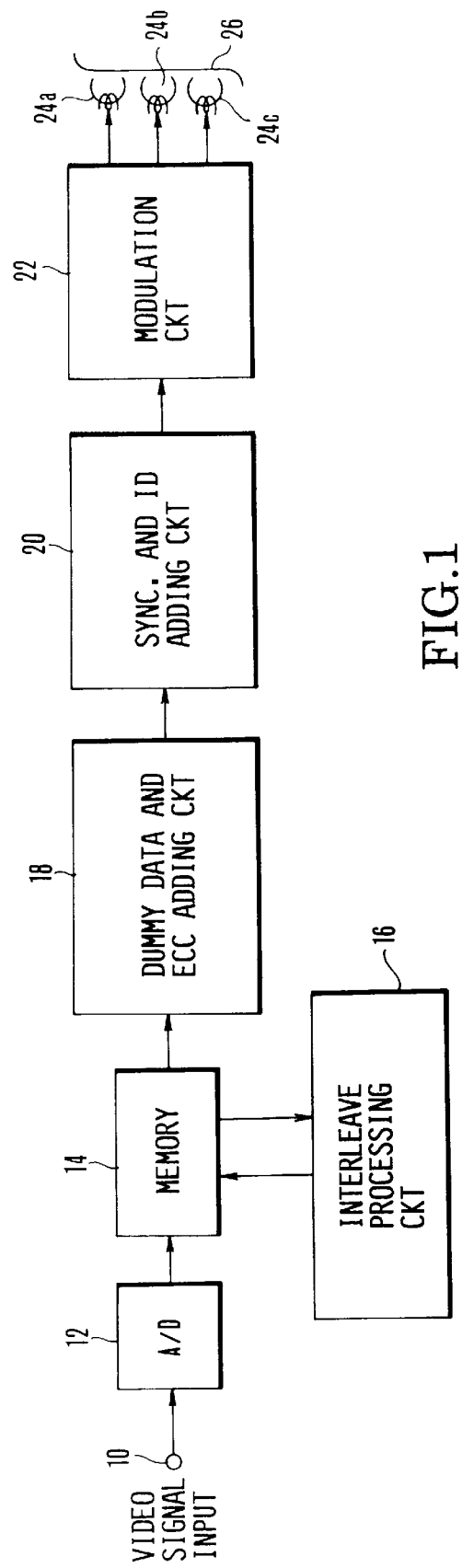
FIG. 1 is a block diagram illustrating the construction of an embodiment of a digital VTR according to the invention.
Figure 2B:
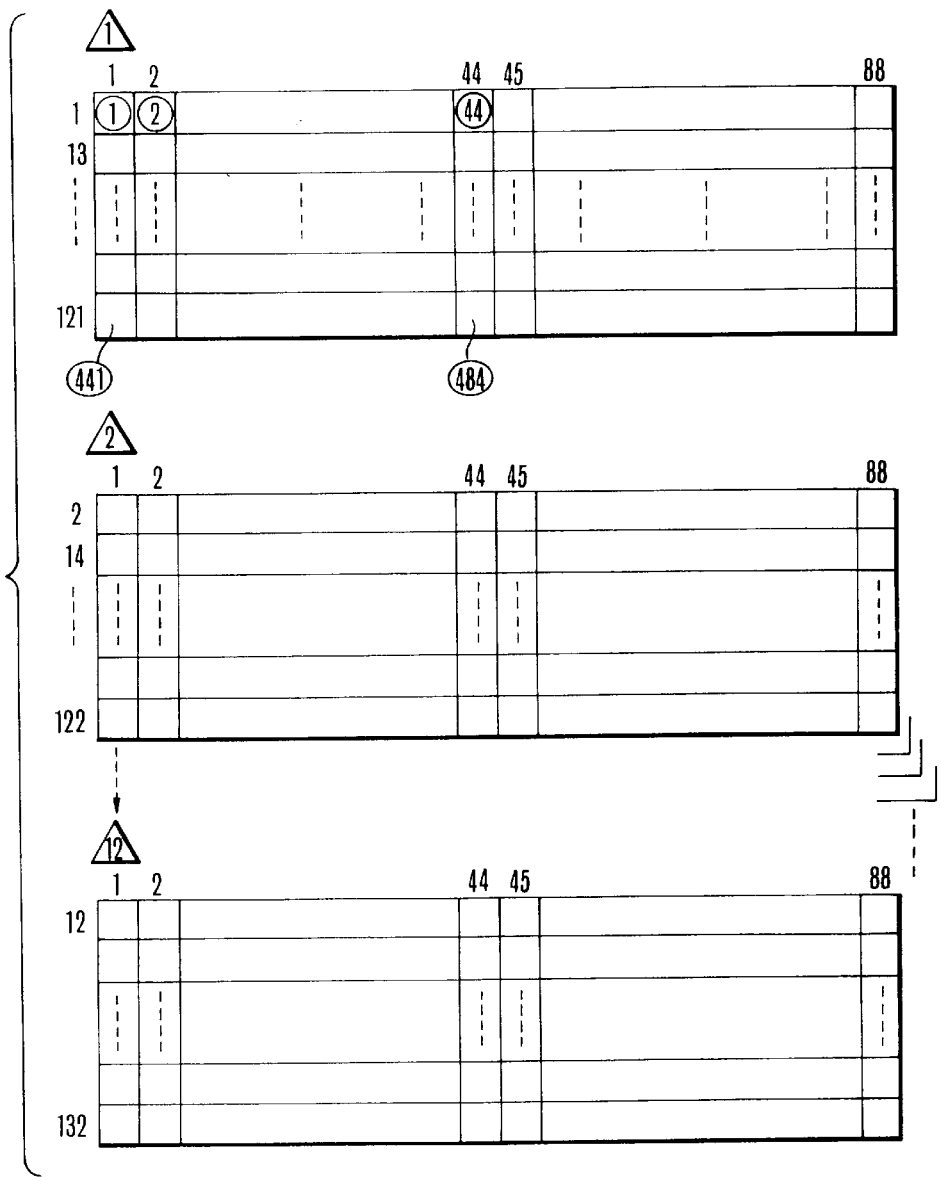
Figure 2C:
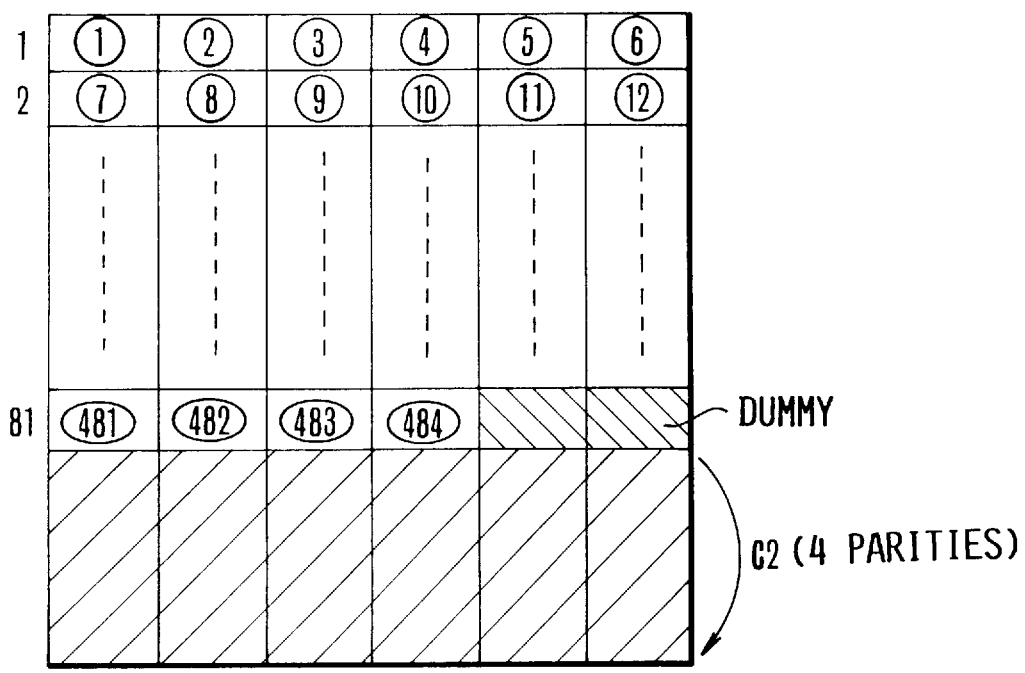

FIG. 1 in block diagram schematically shows the construction of the digital VTR as one embodiment of the invention. First, by using FIGS. 2A, 2B and 2C, the concept of the video data processing of the digital VTR of this embodiment is explained below. FIGS. 2A, 2B and 2C show the course of steps of an interleave processing in one frame of video signals. The one frame of video signals is divided into two parts in the horizontal direction as shown in FIG. 2A. Assuming that an 8×16 matrix of picture elements is taken as a minimum unit (indicated by a hatching in FIG. 2A) for the coding purpose, the minimum unit being hereinafter called a video sub-block, one frame has video sub-blocks in 88 columns and 132 rows, to each of which a video signal is assigned. All the video signals for one frame are grouped in a fashion as follows. That is, as shown in FIG. 2B, from the frame shown in FIG. 2A the video sub-blocks located in the (12n+1)st rows are first extracted. Of these, ones on the left side of the two-division row are made to be a group to be recorded in a first track, and the others on the right side are made to be another group to be recorded in a second track. The "n" ranges from n=0 to 10. Subsequently, in a similar fashion, video sub-blocks located in the (12n+2)nd, (12n+3)rd, (12n+4)th, . . . , (12n+12)th rows are extracted, thus forming groups to be recorded in the respective tracks. For every one frame, the groups corresponding to 24 tracks are formed. Here, the groups formed by the data from the left side of the two-division row of FIG. 2A are to be recorded in the odd-numbered tracks, while the groups formed by the data from the right side are to be recorded in the even-numbered tracks.

Of course, all the lines of FIG. 2A may be read out in the consecutive order from the top, and allocated to the individual groups according to the rule shown in FIG. 2B.

Figure 3:
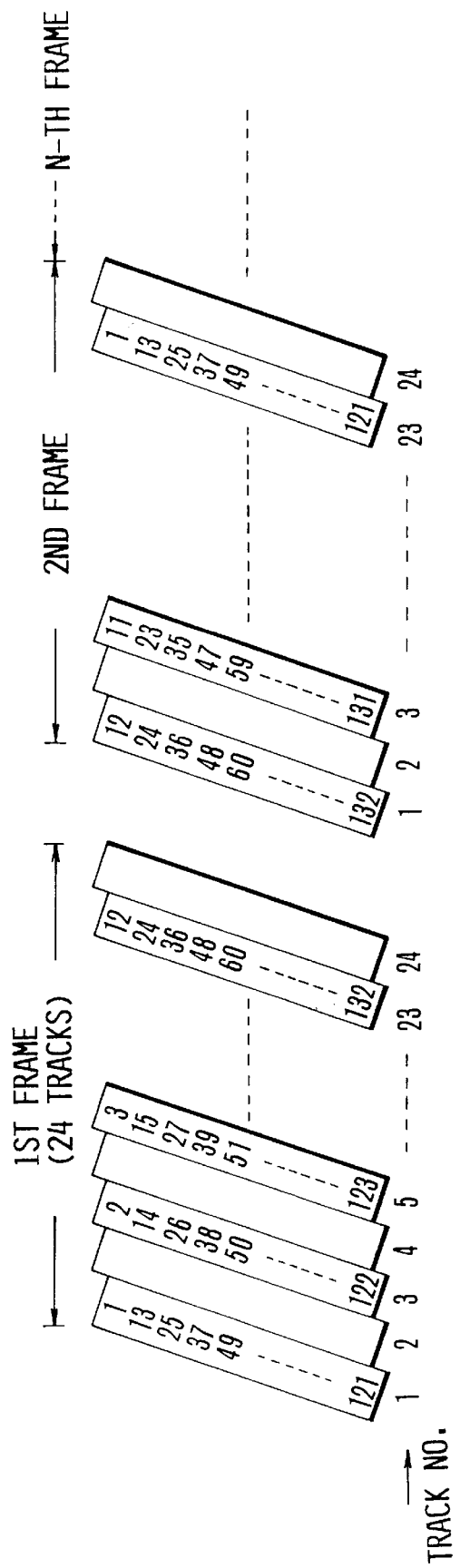
FIG. 3 is a diagram illustrating recorded patterns on a tape by the digital VTR of FIG. 1.

In this embodiment, such an interleave processing as described above is applied to the video signals for a first frame. But, for a second frame, its video signals are subjected to an interleave processing in a different order. In other words, use is made of different interleave rules a algorithms (transforming patterns of the data arrangement) for different frames. This is shown in FIG. 3. In more detail, in the first frame, data in the first row and those that follow after every 12 rows up to the 121st row, totaling 11 rows (i.e., the group in the (12n+1)st rows), is recorded in the first track. On the other hand, in the second frame, the interleave rule is changed so that what is recorded in the first track is the data in the 12th row and those that follow after every 12 rows, which rows, at the time of recording in the preceding frame, have been assigned to the last track (i.e., the group in the (12n+12)th rows). Subsequently, the assignment of the data in the interleave processing is made to ever change as the recording goes on from one frame to another successively.

In other words, the relation of the sequence in which data is recorded on a recording medium or sent out to a transmission path to the arrangement of picture elements on the picture corresponding to those data is made to change by every one frame.

It should be noted that what is shown in FIG. 3 is an example of the way in which the data arrangement pattern (interleave rule) can be applied. Besides this example, many other combinations can be considered.

Further, in order that there is no wasteful space in each of the thus-formed 24 tracks and that a strong protection against burst errors is obtained, another interleave processing is applied. Also, an error correction code called C2 parity (4 parities) is supplemented in each track as shown in FIG. 2C. Dummy data are introduced at two places shown by hatching in FIG. 2C. Numerals 1–484 enclosed within circles are numbers to indicate the coded video sub-blocks which are significant as video information.

Figure 4:
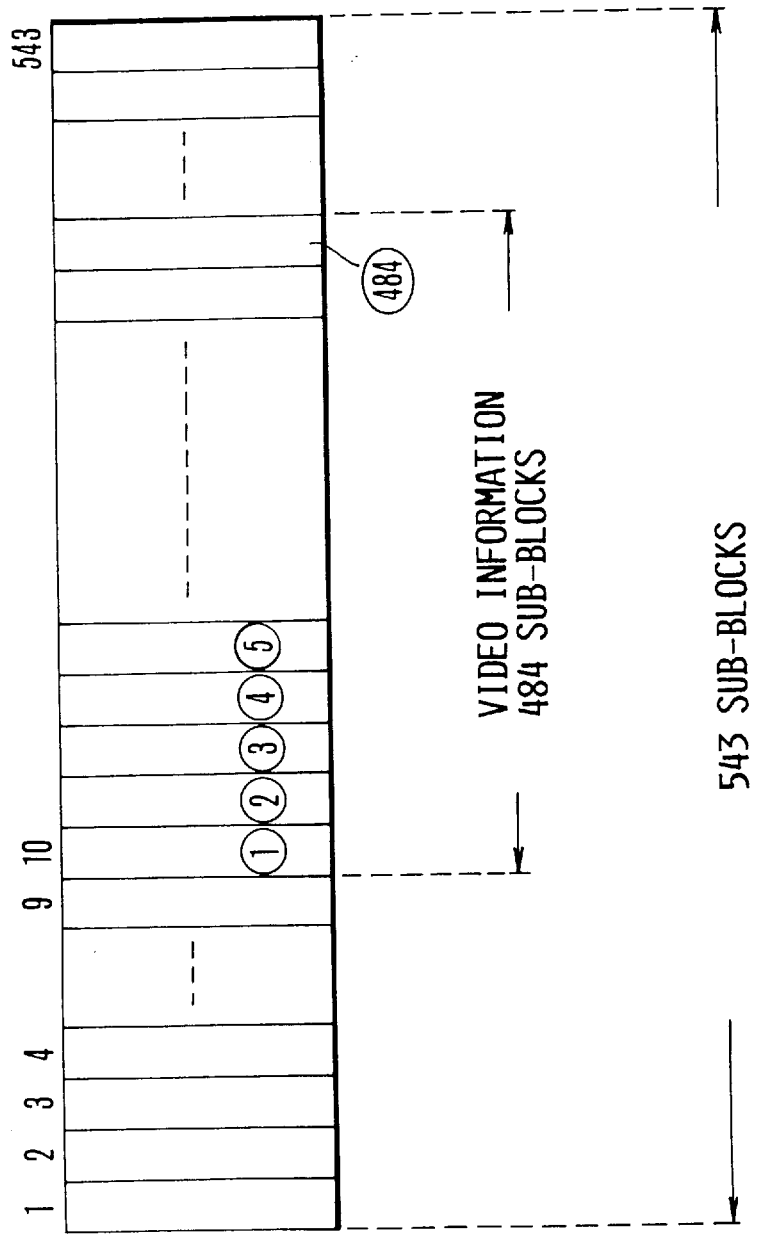
FIG. 4 is a diagram illustrating a recorded pattern of each track by the digital VTR of FIG. 1.
Figure 5:
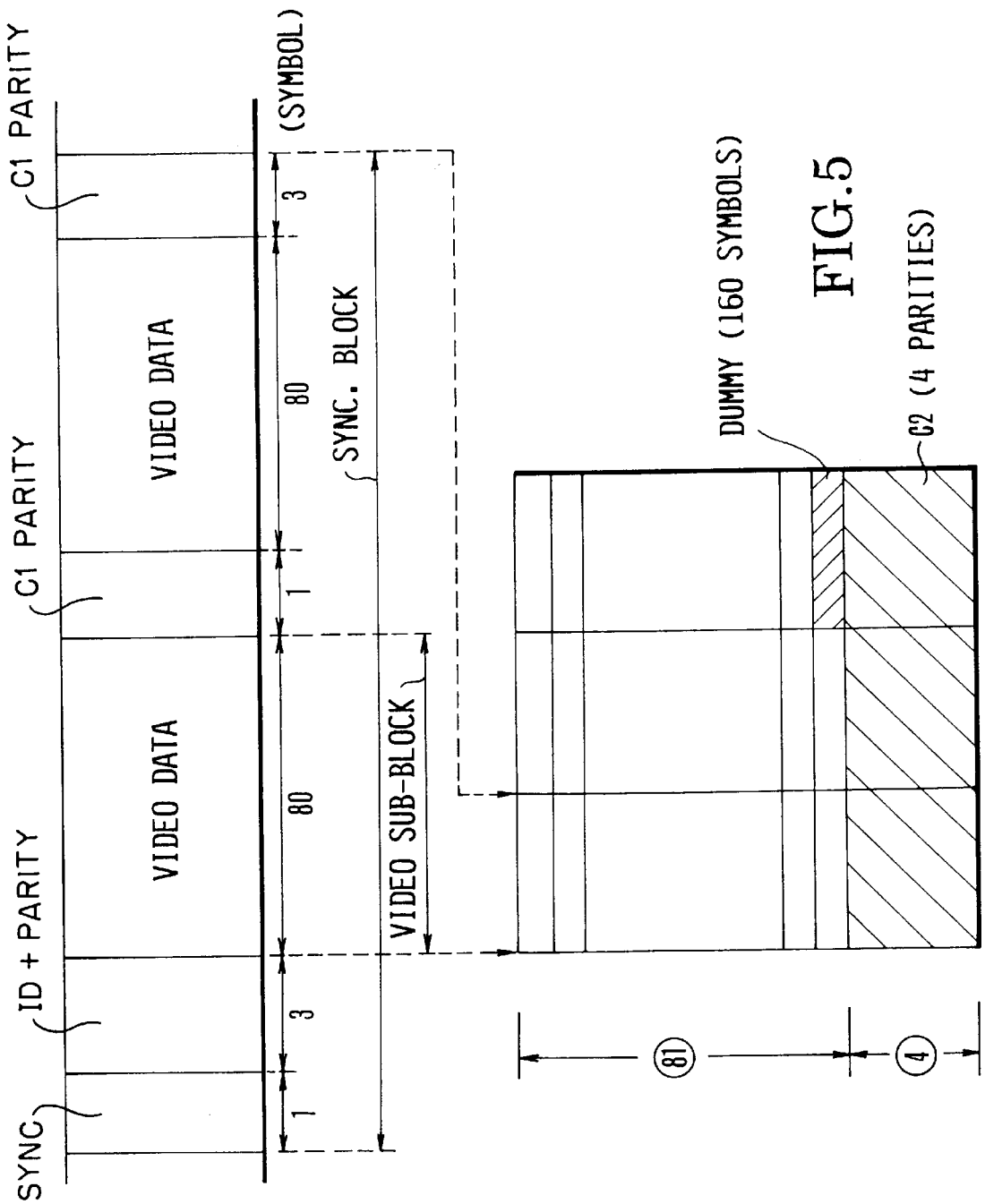
FIG. 5 is a diagram illustrating the format for each sync. block.

A data format for one track is shown in detail in FIG. 4. FIG. 5 shows a block format for a sync. block including two coded minimum units (video sub-blocks). The two video sub-blocks are used to constitute one sync. block with supplement of a sync. code and an ID code. Each video sub-block is supplemented with a C1 parity.

In some reproduction environments, even though they do not allow the data recorded by particular interleave rules to be reproduced, it is sufficiently probable that if they provisionally follow with another set of interleave rules, such data becomes possible to be reproduced. From this reason, since, in the embodiment of the invention, different interleave rules for different frames are adopted, even if one frame is found to be unable to be reproduced in a certain portion, the possibility of recovering this certain portion when the next frame is reproduced is very high. Hence, the probability that a series of continuous pictures are reproduced with a defect in one and the same portion thereof can be remarkably lowered.

In FIG. 1, analog video signals are supplied to an input terminal 10. An A/D converter 12 converts the analog video signals into digital signals. A random access memory 14 is used for the above-described data processing. By using the memory 14 under the control of an interleave processing circuit 16, the interleave processing described in connection with FIGS. 2A, 2B and 2C is carried out. The dummy data and error correction code (ECC) shown in FIG. 2C and FIG. 5 are added to the video signals by a dummy data and ECC adding circuit 18. By a sync. and IC adding circuit 20, the sync. code and ID code shown in FIG. 5 are supplemented. The thus-formed data series is then modulated by a modulation circuit 22. The three outputs of the modulation circuit 22 are recorded in parallel on a tape 26 as a recording medium by recording heads 24a, 24b and 24c.

Although the foregoing has been described taking an example of the recording directly on the recording medium such as the magnetic tape, magnetic disc or optical disc, it also is of course possible to apply the invention to another type of apparatus using a transmission path through which the signals are sent out and received.

As is readily understandable from the foregoing description, according to the invention, the possibility of occurrence of the inability of reproduction, so to speak, fatal situations, can be reduced to almost naught. Again, in application to the apparatus having the interpolation capability for the reproduced image data, it becomes possible that even when an error is being produced in a portion of the picture, that portion can be saved with the help from the same portions of the preceding and following frames due to the permission of using the effective interpolation technique. Thus, the image quality can be prevented from deteriorating. Accordingly, as other image processing techniques become advantageously usable at all times, a great advance in the art has been achieved.

What is claimed is:

1. A video recording apparatus comprising:

(a) input means for inputting video words;

(b) interleaving means for interleaving the video words input by said input means for each picture of the video words.

said interleaving means determining an interleaving algorithm from among a plurality of predetermined interleaving algorithms which are different from each other so that the determined interleaving algorithm changes in turn for every picture of the video words, said interleaving means interleaving the video words according to the determined interleaving algorithm; and (c) recording means for recording video words interleaved by said interleaving means on a recording medium by using a plurality of heads each of which records video words corresponding to a part of each picture, said interleaving means determining the interleaving algorithm such that parts of the video words corresponding to the same position on a screen in each of two successive pictures are recorded by a different head among the plurality of heads.

2. An apparatus according to claim 1, wherein the plurality of heads are arranged to record the video words simultaneously.

3. An apparatus according to claim 1, wherein said interleaving means interleaves video sub-blocks each of which consists of video words corresponding to (n×m) picture elements, in which n and m are integers.

4. An apparatus according to claim 3, wherein said interleaving means interleaves video blocks each of which includes a plurality of the video sub-blocks.

5. An apparatus according to claim 4, wherein each of the plurality of heads records a plurality of the video blocks in a recording track formed on the recording medium.

6. A recording apparatus, comprising:

(a) input means for inputting video data;

(b) interleaving means for interleaving the input video data for each picture of the input video data according to an interleaving algorithm, said interleaving means changing the interleaving algorithm for every picture of the video data; and (c) recording means for recording the video data interleaved by said interleaving means, said recording means recording the video data corresponding to one picture on a predetermined number of tracks of many tracks provided on a recording medium, said interleaving means changing the arrangement of the video data in units each corresponding to one track.

7. An apparatus according to claim 6, wherein said interleaving means determines the interleaving algorithm from among a plurality of interleaving algorithms which are different from each other, and wherein said interleaving means interleaves the video data according to the determined interleaving algorithm.

8. An apparatus according to claim 6, wherein said interleaving means includes a memory for storing the input video data, and wherein said interleaving means interleaves the video data by controlling addressing of the memory.

9. A recording apparatus, comprising:

(a) process means for dividing input video data into a plurality of blocks and forming a plurality of data groups each of which is composed of a plurality of of the blocks, the video data being coded in units each corresponding to one block;

(b) interleaving means for interleaving the input video data for each picture of the input video data according to an interleaving algorithm, said interleaving means changing the interleaving algorithm for every picture of the video data, and (c) recording means for recording the video data interleaved by said interleaving means, said interleaving means changing the arrangement of the video data in units, each corresponding to one data group.

10. An apparatus according to claim 9, wherein said interleaving means determines the interleaving algorithm from among a plurality of interleaving algorithms which are different from each other, and wherein said interleaving means interleaves the video data according to the determined interleaving algorithm.

11. An apparatus according to claim 9, wherein said interleaving means includes a memory for storing the input video data, and wherein said interleaving means interleaves the video data by controlling addressing of the memory.

* * * * *

UNITED STATES PATENT AND TRADEMARK OFFICE
CERTIFICATE OF CORRECTION

PATENT NO.    : 5,809,209
DATED         : September 15, 1998
INVENTOR(S)   : Hidenori Hoshi, et al.

It is certified that error appears in the above-identified patent and that said Letters Patent is hereby corrected as shown below:

Col. 3, line 22, delete "a" and insert --or--.

Signed and Sealed this

Eleventh Day of May, 1999

Attest:

Q. TODD DICKINSON

Attesting Officer

Acting Commissioner of Patents and Trademarks